Aug. 21, 1934.   R. SUCZEK   1,970,823
VEHICLE WHEEL SUSPENSION AND SPRINGING
Filed July 16, 1932   2 Sheets-Sheet 1
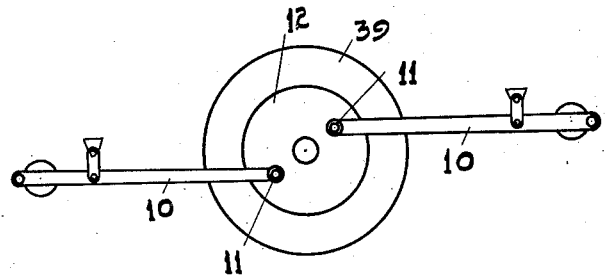
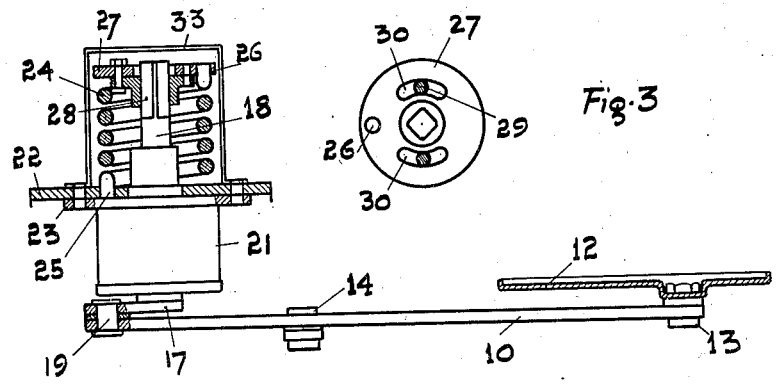
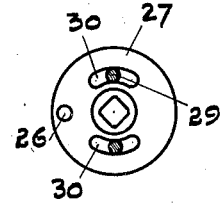
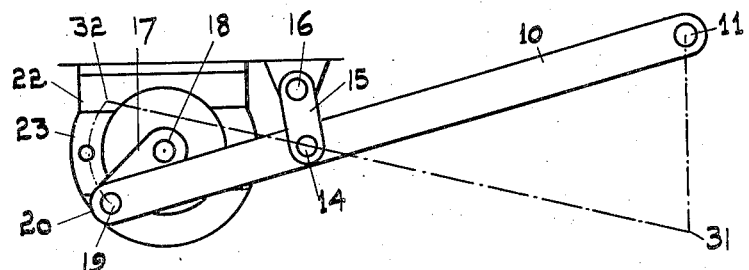
INVENTOR.
Robert Suczek Aug. 21, 1934.   R. SUCZEK   1,970,823

VEHICLE WHEEL SUSPENSION AND SPRINGING

Filed July 16, 1932   2 Sheets-Sheet 2

Robert Suczek
INVENTOR.

Patented Aug. 21, 1934

1,970,823

UNITED STATES PATENT OFFICE 1,970,823

VEHICLE WHEEL SUSPENSION AND SPRINGING

Robert Suczek, Grosse Pointe Park, Mich.

Application July 16, 1932, Serial No. 622,839

34 Claims. (Cl. 267—20)

My invention relates to any kind of vehicles on wheels such as automobiles, trailers, horse carriages, trucks, busses and similar.

Some of the purposes of this invention are: reduction of manufacturing costs, simplicity, reduction of weight and particularly of unsprung weight, improvement in riding comfort, reduction of wind resistance.

Another very important purpose of this invention is that it gives the possibility to use frictionless springs which at the same time can be adjusted according to the load which the spring is supposed to carry. This present frictionless spring eliminates the necessity of lubricating the spring and its wear. Due to this fact the spring of my present invention remains always absolutely quiet.

It is a well known fact that better riding qualities are obtained by reducing the unsprung weight of a vehicle, through this invention the unsprung weight is reduced to one or two halves of a lever or two of which even a portion is balanced, so that the unsprung weight comprises almost only the weight of the wheel, its hub with the bearing and the brake.

My invention mainly consists of a double armed lever suspended on the vehicle body or frame at a point somewhere intermediate its ends. The wheel being attached to one end of the lever and a spring acting on the other end of the lever through the medium of a crank. By proportioning the lever arms and the length of the crank according to a simple mathematical relation it is possible to obtain a straight line motion or substantially straight line motion of the point to which is attached the wheel, thus forcing the wheel to move in a line perpendicular to the vehicle body without performing any swinging motion, which would be objectionable because causing wear of the tire. It further consists in using two such levers on one wheel. One lever being for instance arranged laterally the other transversely, or one laterally the other one at an angle to the longitudinal axis of the vehicle. Or both levers may be arranged at an angle to such an axis.

Furthermore this invention consists in using a helical cylindrical or conical spring which takes the weight of the vehicle up by torsion and which gives the possibility of adjusting it, to meet various load conditions.

The invention further consists in the arrangement of the shock absorber on the shaft of the crank on which the spring acts. It further consists in the fact that the levers can be attached to the body of car or vehicle without the necessity of having the conventional frame. That is to say, it simplifies the entire chassis construction of the vehicle, since the vehicle may be made frameless and the wheels can be attached to almost any desirable or convenient point of the body, causing the car to be very low, with low center of gravity thus giving an exceptionally good riding comfort.

With these and other advantages and objects in view, my invention consists in the arrangement, construction and combination of various parts of my new device as described in the specification, claimed in the claims and illustrated in the accompanying drawings, in which:

Fig. 1 is a top view partly in section showing the arrangement of the main suspending lever, the crank, the shock absorber housing with the coil spring, its adjustment and the attachment of the wheel.

Fig. 2 is a side view of Fig. 1.

Fig. 3 is a top view of Fig. 1 showing the spring adjustment.

Fig. 4 is a side view of a wheel with two suspension levers attached thereto.

Figure 5:
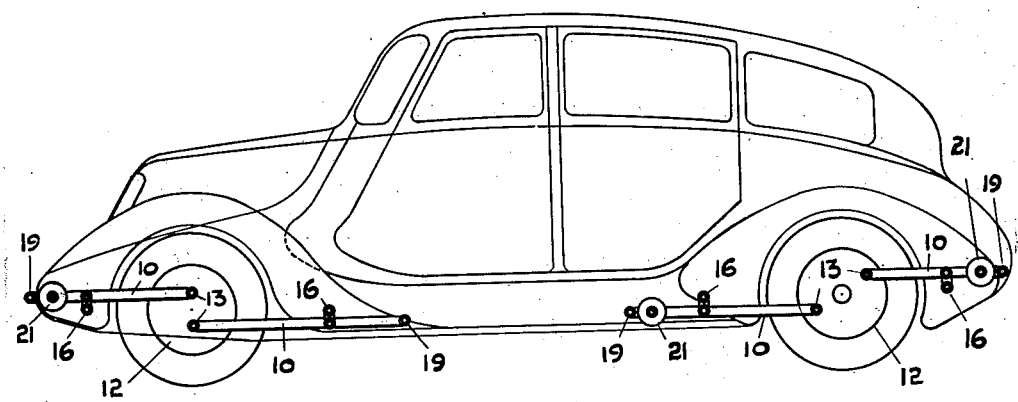
Fig. 5 is a side elevation of a frameless automobile (drawn as a transparent silhouette) with wheels suspended according to my invention.

Although I have illustrated only a few possibilities of arranging the suspension levers of the wheels in relation to the car body (Figs. 5 and 6); it may be understood that many other arrangements according to the design and layout of the car body, the location of the engine and of the transmission and of the differential gearing, of the different cross members and floor members, are possible, without departing from the spirit of my invention particularly as far as the frameless car design is concerned.

Referring to Figs. 1 and 2 reference character 10 indicates the main lever.

To one end of lever 10 is attached at 11 the backing plate 12 of the wheel by screw and bolt 13. At 14 the lever 10 is hinged by means of a shackle 15 to a point 16 of the frame or the body of the car.

Crank 17 is mounted on shaft 18 to rotate therewith and the crank pin 19 is hinged to the other end 20 of the lever 10. Surrounding shaft 18 is the shock absorber or damper housing 21 which is screwed to the frame or the body 22 by flange 23. A helical cylindrical spring, with torsional resistance, 24 is hooked with its end 25 into a hole in the body and with its other end 26 into a hole of plate 27 (see also Fig. 3). The end of shaft 18 is splined or squared and fits into the hub 28 which is pressed against the spring plate 27 by two bolts 29. In order to change the tension of the spring, the spring plate 27 is provided with slots 30 into which the screws 29 are inserted. By fixing the plate 27 in different positions to hub 28 the tension of the spring may be varied as required by the load, which the springs or the wheels have to carry.

In Fig. 2 the point 11 at which is attached the wheel is in its highest position. Its lowest position is indicated by a dot and dash line at 31. The path of the bolt 13 is therefore the distance between 11 and 31. While this lever end is at 31 the other end 20 is in its highest position at 32 and with it the crank 17. The mechanical motion of the levers is so simple that it does not require any explanation. It may be said that lever arm 14—11 is longer than arm 14—19 and this in turn is longer than the crank arm.

The proportion of these 3 arms is chosen in such a way that the motion of point 11 towards point 31 or back is very closely a straight line. (A small deviation may enter only due to the short length of the shackle 15.)

A cap 33 Fig. 1 covers the spring and the adjusting mechanism. The shock absorber details within the housing 21 are not shown in the drawing, since applicant does not claim any particular shock-absorber design but only its arrangement on shaft 18. Any kind of the many known shock absorbers may be used in this combination which will produce the necessary damping action between the shaft and housing 21.

In Fig. 4 is shown a wheel 34, backing plate 12 and two main levers 10—10 attached at points 13—13 of the backing plate. Other reference characters in Fig. 4 are the same as in Figs. 1 and 2 indicating identical parts.

It may be seen that if points 11 of both levers 10 and 10 move in a vertical line, the entire wheel 34 must necessarily move also on a vertical line, without performing any kind of swinging motion.

Figure 6:
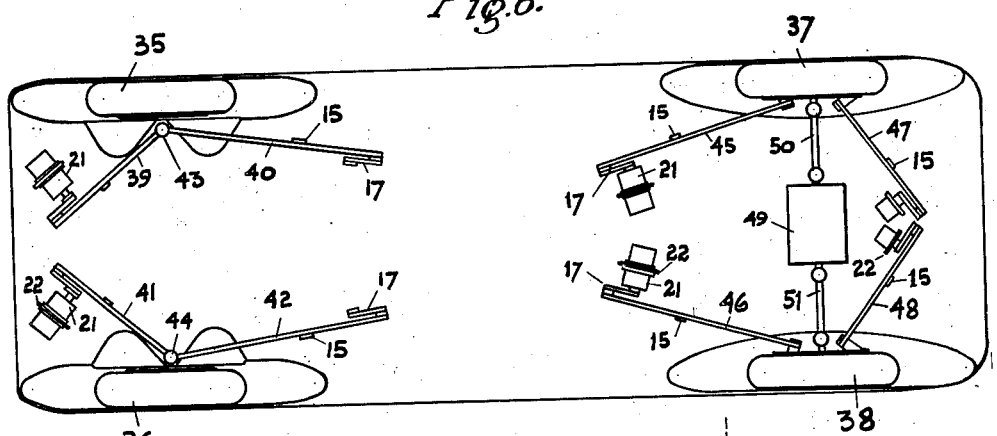
Fig. 6 is a bottom view of the car shown in Fig. 5.

Figs. 5 and 6 show an automobile body equipped with wheels which are suspended according to my invention.

Each wheel of the car 35, 36, 37 and 38 is connected to two main levers. In Fig. 6 I have indicated different arrangements and combinations of the main lever, the shock absorber and the spring, in relation to each other and to the car body.

The levers 39, 40 and 41, 42 of the front wheels are attached to the king pin housing 43 and 44 respectively. The front levers 39 and 41 are equipped with springs and with shock absorbers, while the other two front levers 40 and 42 are without springs and without shock absorbers. Levers 40 and 42 perform only the duty of guiding the wheels in a vertical plane and taking up longitudinal forces. The rear wheel levers 45 and 46 are again equipped with shock absorbers and with springs, while the other two levers 47 and 48 are without the shock absorbers but have the springs.

It may be readily understood that any combination of springs and shock absorbers may be used on one car. It is possible for instance to equip all levers with springs and only four levers with shock absorbers. Or only four springs may be used in combination with two or four shock absorbers.

As to the location of the levers 10, it is possible to arrange them in any desirable position. One of the levers of a wheel may be arranged parallel or closely parallel to the longitudinal axis of the car, the other may be perpendicular to such axis for taking up side swaying and transverse thrust forces.

As indicated in Fig. 6 the main levers 10 of each wheel form an obtuse angle and are set so that one of such levers will take up with greater advantage the longitudinal, the other lever of the same wheel the transverse forces. It may be noted that the two levers of one and the same wheel may be of different length. Due to the possibility of arranging the points of attachment 16 and 22 of a lever almost at any desirable place of the car body or frame, swaying and spring reactions as they occur in cars with conventional leaf spring suspension are greatly diminshed or almost entirely eliminated and the riding comfort greatly improved.

The conventional leaf spring suspension has eight points attached to the frame of the car, while the suspension according to this invention has 16 points of attachment to the car body or to the frame. This feature gives the entire system a great rigidity and stability distributes the stresses into the body or frame more uniform and at points where they can be well taken care of, at the same time reducing such stresses since they are transmitted to twice the number of points as in any conventional car.

In Fig. 6 part 49 may be the differential or transmission gear housing from which the rear wheels are driven by shafts 50 and 51. The engine which is not shown in the drawing may be located either in the rear or in the front of the car as may be desirable or preferable.

Figure 7:
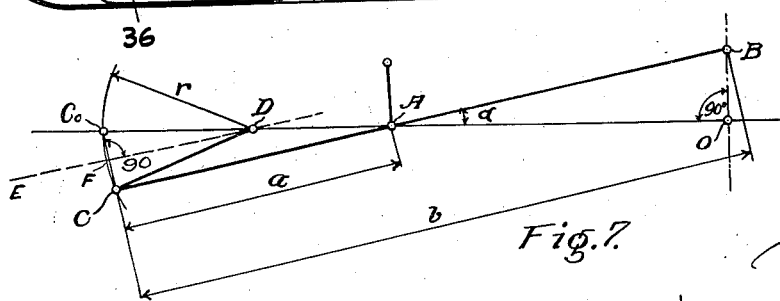
Fig. 7 is a diagrammatic sketch indicating the geometric or graphical way of determining the proportions of the levers and the location of the pivots and fulcrum.

In Fig. 7, A is the fulcrum of the double armed lever CAB. B is the point travelling on a straight line OB. CoAO is a horizontal line to which OB is perpendicular. Point D is supposed to lie on line CoAO. Its location on the line CoAO and its distance from point C is found as follows:

Assuming that the length of the double armed lever CB is $b$ and the ratio of its arms CA and AB are known. The lever CAB is drawn in its extreme position forming with the horizontal line CoAO the angle alpha ($\alpha$) and intersecting it at A. BO is perpendicular to CoAO and the distance OCo is made to equal the total length $b$ of the lever CAB. Point Co is connected with point C by a straight line and a perpendicular line EF is erected in center F between points C and Co. This line EF intersects line CoA at D, which is the point around which the radius rod CD must rotate in order to make the point B travel on a straight line OB. It may be found by simple mathematics or a geometrical lay-out, that for small angles alpha and beta, representing the amplitudes of the lever CAB around the horizontal line AO, the path of the point B is practically a straight line. For these small angles the ratio of the lever arms and the crank radius or arm $r$ may be assumed with sufficient accuracy to be:

$$r:a = a:b \text{ or, } br = a^2$$

Figure 8:
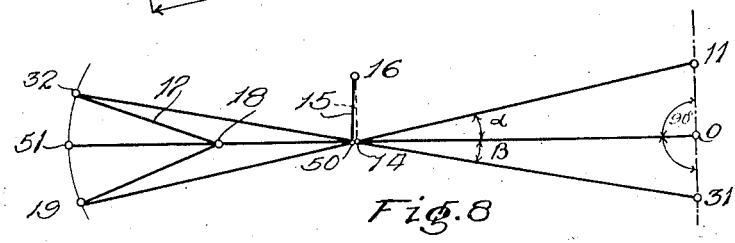
Fig. 8 is a diagram indicating the double armed lever and the crank in three different positions, while one end of the lever is moving in a straight line.

Fig. 8 is an illustration of the motion of all levers, the crank arm and the shackle. Point 11 moves on the straight line 11—0—31 when moving the lever 19—50—11 through the angle alpha into the horizontal position. Point 19 moves to 51 on a circle around fixed point 18 with the radius 17, and point 11 moves to 0, while fulcrum 14 moves to point 50, swinging around point 16 with the shackle 15 as a radius. Moving arm 14—11 below the horizontal line through the angle beta, point 0 moves to 31, point 51 to 32 and point 50 towards 14.

What I claim is:

1. In a vehicle wheel suspension, a two armed lever with unequal arms and a fulcrum between said arms, means to support said fulcrum by a member attached to the vehicle, means to guide the shorter arm end of the lever on a circle by pivotally connecting it to a crank arm rotating around an axis with a shaft located in a journal, means to pivotally attach a vehicle wheel structure to the end of the longer arm, the crank arm length and the lever arm ratio being of such proportions as to cause the pivot of the wheel structure to move on a straight line, the crank arm journal being attached to the vehicle in such a way as to make the crank arm point in a general direction away from the lever fulcrum.

2. A vehicle wheel suspension as claimed in claim 1, and a spring acting between the crank arm shaft and the body or frame of the vehicle.

3. In a vehicle wheel suspension, a two armed lever with unequal arms and a fulcrum between said arms, means to movably support said fulcrum by a shackle on the vehicle, means to guide the shorter arm end of the lever on a circle by pivotally connecting such end to a crank arm rotating around an axis with a shaft journaled in a bearing, the bearing being attached to the vehicle body or frame in such a way as to make the crank arm point in a general direction away from the lever fulcrum, means to pivotally attach a vehicle wheel structure to the end of the longer lever arm, the crank arm length, the short arm length and the total lever length being so proportioned as to cause the wheel structure pivot to move on a substantially straight line.

4. In a vehicle wheel suspension with independently sprung wheels moving relative to the vehicle body on a substantially straight line, a shock absorber for damping the relative motion of the wheel to the body, the shock absorber comprising a shaft journaled in a bearing carried by the vehicle body or frame, a spring for resiliently supporting the body on the wheel through the medium of a structure comprising a double armed lever, said spring acting on said shaft and having its point of reaction in the vehicle body or frame, and means to vary the spring tension to suit the load on the wheel.

5. The combination of a vehicle body with an independently sprung wheel moving on a substantially straight line relative to the body, a wheel structure suspension mechanism comprising two double armed levers, a spring yieldably connecting the wheel through the suspension to the vehicle body or frame and means to attach said mechanism at two points to the wheel structure and at four points to the body or frame of the vehicle.

6. A vehicle wheel suspension for independently sprung wheels moving relative to the vehicle body on a substantially straight line, said wheel suspension comprising two first class levers with two arms, means to attach one end of each of said levers to the wheel structure and means to attach or suspend another point of each of said levers indirectly to the vehicle body or frame in such a way that when orthogonally projecting the levers into a plane on which the vehicle could stand, the projections of the lever center lines will form an angle of less then 180 degrees in the said plane.

7. In an independently sprung vehicle wheel structure suspension system comprising two double armed levers each having a fulcrum suspended by a shackle from the vehicle body or frame, a backing plate in the wheel structure attached to the wheel spindle or shaft carrying the wheel, means to resiliently transmit a part of the vehicle weight to one arm of each of the levers and means to pivotally connect the other arms of the levers to a wheel structure member to carry the spindle and the wheel.

8. The combination of a wheel structure, a wheel suspension and an automobile body structure, means to pivotally attach the wheel suspension at two points to the wheel structure and at four points to the body structure, the suspension comprising two double armed first class levers, two shackles and two cranks each having a shaft, and at least one spring connecting one of said shafts resiliently to the body structure, the shackles and the shafts being journaled in the body structure.

9. In a wheel structure suspension mechanism for independently sprung wheels on a vehicle body comprising a double armed first class lever whose arms are of unequal length, suspending the fulcrum of the lever by a shackle on the body structure or frame, means to guide the shorter arm of the lever on a circle and means to attach the wheel structure to the other arm of the lever, the lever and the shackle being substantially rigid bodies.

10. In a vehicle wheel suspension, a two armed lever, with a fulcrum between said arms, means to support said fulcrum by a member carried by the vehicle body or frame, means to guide one end of the lever on a circle by pivotally connecting it to a crank arm rotating around an axis with a shaft located in a journal, means to pivotally attach a vehicle wheel structure to the end of the other arm, the crank arm length being so proportioned as to cause the pivot of the wheel structure to move on a substantially straight line, and the crank arm shaft journal being connected to the said body or frame of the vehicle in such a way as to make the crank arm point in a general direction away from the lever fulcrum.

11. A vehicle wheel structure suspension means, comprising two units of linkage mechanisms, each unit comprising a lever each swinging in a different plane, means within each unit to make a point of each lever move on parallel lines, means to attach said parallel moving lever points to the wheel structure, and means to attach the levers to the vehicle in such a way that the said planes will form an angle less than 180 degrees.

12. A vehicle wheel structure suspension means, comprising two units of linkage mechanisms, each unit comprising a member swinging in a different plane, means with each unit to cause a point of each member to move in a common line, means to attach said moving points to the wheel structure and means to attach the members to the vehicle in such a way that the said planes will intersect in the line in which the points move.

13. In a vehicle wheel suspension, a two armed lever with a fulcrum between the arms, means to support said fulcrum by a member attached to the vehicle, means to guide a point of one arm of the lever on a circle by pivotally connecting it to a crank arm rotating around an axis with a shaft located in a journal, means to pivotally attach the vehicle wheel structure to the other lever arm, the crank arm length and the lever arm ratio being of such proportions as to cause the pivot of the wheel structure to move on a straight line, the crank arm journal being attached to the vehicle in such a way as to make the crank arm point substantially in a direction away from the lever fulcrum.

14. In a vehicle wheel suspension, for independently sprung wheels, a two armed lever with the fulcrum between said arms supported by a shackle attached to the vehicle, means to guide a point of one lever arm in a circle, by pivotally attaching it to a crank arm rotating around an axis with a shaft journaled to the vehicle, means to pivotally attach the wheel structure to the other lever arm, the crank arm length and the lever arm ratio being of such proportions as to cause the wheel pivot to move on a straight line, and the journal being attached to the vehicle in such a way as to make the crank arm point substantially in a direction away from the lever fulcrum.

15. In a vehicle wheel suspension, for independently sprung wheels, a two armed lever with the fulcrum between said arms supported by a member attached to the vehicle, means to guide one lever arm end on a circle around an axis fixed in relation to the vehicle, means to pivotally attach the other lever arm end to the wheel structure, means to guide the latter lever arm end on a substantially straight line, a coil spring wound around said axis acting with one end through the crank arm to uphold the vehicle weight, the other end of the spring having its point of reaction against the vehicle body or frame structure.

16. A vehicle wheel suspension comprising a double armed lever with a fulcrum between the two arm ends, means to transmit the fulcrum reaction forces to the vehicle structure, means to force one arm end to travel on a circle and the other arm end to travel on a substantially straight line, and means to attach the wheel structure to the arm end traveling on the straight line.

17. A vehicle wheel suspension for independently sprung wheel structures comprising two double armed levers each having a fulcrum between the arm ends, means to transmit the fulcrum reaction forces to the vehicle structure, means to force one point of an arm of each lever to travel on a circle, and a point of the other arm of each lever to move on substantially straight, parallel lines, means to attach a wheel structure of the vehicle to both lever points traveling on straight lines and resilient means acting at least through one of said levers to support the vehicle weight.

18. A vehicle wheel suspension for independently sprung wheel structures comprising a double armed lever with a movable fulcrum between the two arm ends, means to transmit the fulcrum reaction forces to the vehicle structure, means to force one arm end to travel on a circle and the other arm end to move on a substantially straight line, means to attach a wheel structure to the lever end that moves on a straight line, resilient means acting through the lever to support the vehicle on the wheel structure, and shock absorbing means acting on the vehicle through the lever end which is guided on the circle.

19. A vehicle wheel suspension for independently sprung wheel structures, comprising a double armed lever with a fulcrum between the two arm ends, means to transmit the fulcrum reaction forces to the vehicle structure, means to force a point of one arm to travel on a predetermined curve and a point of the other arm on a substantially straight line, and means to attach pivotally the wheel structure to said other arm.

20. A vehicle wheel suspension for independently sprung wheel structures, comprising two double armed levers, each having a fulcrum between the arm ends, means to transmit reactionary fulcrum forces to the vehicle structure, means to force one arm end of each lever to travel on a curve and the other end of each lever to travel on substantially straight parallel lines, means to attach these latter ends of the levers to the vehicle structure, and means to arrange the levers of the suspension relative to each other in such a way, that their orthogonal projections, into a plane on which the vehicle stands, form an angle of less than 180 degrees.

21. A multi wheel vehicle with independently sprung wheels, a pair of first class levers suspending each independently sprung wheel on the body or from the structure of the vehicle, and at least one resilient shock absorbing medium acting through a lever of the pair on each independently sprung wheel, means to cause one end of each lever of the pair to move on substantially straight, parallel lines and means to attach these ends to the wheel structure.

22. In an independently sprung vehicle wheel suspension system permitting the wheel structure to perform parallel motions substantially perpendicular to the vehicle, the system comprising a double armed lever, one arm carrying the wheel structure, the other arm being guided on a predetermined curve, and means to transmit a spring force through the guided arm end for supporting vehicle weight on the wheel structure, the spring having its point of reaction in the vehicle body or frame structure.

23. In an independently sprung vehicle wheel structure suspension system comprising a double armed first class lever, means to take up the fulcrum forces by the vehicle body or frame structure, means to guide one arm of the lever on a predetermined curve and transmitting a spring force through this arm to the other arm carrying the unsprung weight of the wheel structure, the vehicle body weight resting on the fulcrum and on the guiding means.

24. In a frameless vehicle body construction with independently sprung wheels, a wheel structure comprising a spindle carrying the wheel, the independent suspension of a wheel comprising two double armed first class levers, each pivotally connected by one end to the wheel structure to carry the spindle, means to support the two levers at their fulcrums so as to transmit fulcrum reaction forces to the vehicle structure, and means to cause the lever ends, attached to and carrying the wheel spindle and wheel structure, to move on substantially straight lines, by guiding the other ends through suitable linkages carried by the vehicle body or frame structure.

25. In an independently sprung vehicle wheel suspension in which a point of the wheel travels on a substantially straight line when the wheel structure is displaced relative to the vehicle body, the suspension comprising two arms, each oscillating around an axis suspended from or supported by the vehicle body or frame structure, an elastic medium reacting against the vehicle body or frame structure and resiliently supporting the vehicle weight on the wheel structure, and means whereby the axes of the arms are located at acute angles to the longitudinal vertical vehicle center plane.

26. In an independently sprung vehicle wheel suspension, the vehicle having a frame and/or body structure and a wheel structure, the suspension comprising a lever whose fulcrum is suspended from or supported by the vehicle body or frame structure, means to hingeably attach the wheel structure to the lever, elastic means acting through said lever to resiliently support the vehicle weight on the wheel structure, means hingeably suspended from or supported by the vehicle body or frame structure and pivotally attached to the wheel structure to guide a point of the wheel on a substantially straight line when displaced to some extent relative to the vehicle body and means to locate the fulcrum axis at an acute angle to the vertical longitudinal center plane of the vehicle.

27. In an independently sprung vehicle wheel suspension, the vehicle having a frame and/or body structure and a wheel structure, the suspension comprising a lever whose fulcrum is suspended from or supported by the vehicle body or frame structure, means to hingeably attach the wheel structure to the lever, elastic means acting through said lever to resiliently support the vehicle weight on the wheel, an arm pivotally suspended from or supported by the vehicle body or frame structure, and hingeably attached to the wheel structure for guiding a point of the wheel in collaboration with the lever, on a substantially straight line when the wheel is displaced relative to the vehicle body and means to locate the fulcrum axis of the lever and the pivot axis of the arm at acute angles to the longitudinal vertical center plane of the vehicle.

28. In an independently sprung vehicle wheel suspension in which a point of the wheel travels at least for some distance on a path approximating a straight line when the wheel structure is displaced relative to the vehicle body, the suspension comprising two arms each oscillating around an axis suspended from or supported by the vehicle body or frame structure, an elastic medium reacting against the vehicle body or frame structure and resiliently supporting the vehicle weight on the wheel, means to attach hingeably both arms to the wheel structure, one arm below, the other arm above the center line of the wheel, and means whereby the axes of the arms are located at acute angles to the vertical longitudinal vehicle center plane.

29. In an independently sprung vehicle wheel-structure suspension, the structure comprising a wheel, its spindle and a king-pin, and the suspension being of the type in which a point of the wheel travels on a substantially straight line when the wheel structure is displaced relative to the vehicle body, the suspension comprising two arms each oscillating around an axis suspended from or supported by the vehicle body or frame structure, an elastic medium having its point of reaction in the vehicle body or the frame structure and resiliently supporting the vehicle weight on the wheel structure, and means whereby the axes of the arms are located at equal acute angles to the vertical longitudinal vehicle center plane and the arms being of unequal length.

30. In an independently sprung vehicle wheel suspension in which a point of the wheel travels on a substantially straight line when the wheel structure is displaced relative to the vehicle, the suspension comprising a lever whose fulcrum is suspended from or supported by the vehicle body or frame structure, means to hingeably attach the wheel structure to the lever, elastic means acting through said lever to resiliently support the vehicle weight on the wheel structure, means pivotally suspended from or supported by the vehicle body or frame structure and hingeably attached to the wheel structure, and means to locate the fulcrum axis and the pivot axis at acute angles to the vertical longitudinal center plane of the vehicle.

31. In an independently sprung vehicle wheel suspension in which a point of the wheel travels on a substantially straight line at least for a part of travel when displaced relative to the vehicle body, the suspension comprising two arms each oscillating around an axis suspended from or supported by the vehicle body or the frame structure, an elastic medium acting through an arm and reacting against the vehicle body or frame structure and resiliently supporting the vehicle weight on the wheel structure, and means whereby the axes of oscillation of the arms are located at acute angles to the longitudinal vertical vehicle center plane.

32. In an independently sprung vehicle wheel suspension, the vehicle having a frame and/or body structure and a wheel structure comprising a wheel, a spindle and a king pin bearing, the suspension comprising a lever whose fulcrum is suspended from or supported by the vehicle body or frame structure, means to hingeably attach the wheel structure to the lever, elastic means acting through said lever to resiliently support the vehicle weight on the wheel, an arm pivotally suspended from or supported by the vehicle body or frame structure, and hingeably attached to the wheel structure, for guiding a point of the wheel periphery, in collaboration with the lever, on a line substantially straight at least for some length of the wheel travel when the wheel is displaced relative to the vehicle body, and means to locate the fulcrum axis of the lever and the pivot axis of the arm at acute angles to the longitudinal vertical center plane of the vehicle.

33. The combination of a vehicle wheel structure suspension with a shock absorber, the vehicle comprising a frame and/or a body structure, the shock absorber comprising a shaft actuated by a crank, means to hingeably attach the crank to a lever, means to suspend from or support by the body or frame structure the lever in such a way that a point of the lever will move on a substantially straight line, and means to attach the point so moving to a member which moves with the wheel or the wheel structure when the wheel is displaced relative to the vehicle body or frame structure.

34. In combination of a vehicle wheel suspension with a shock absorber, means to resiliently suspend the wheel from the vehicle, means to transmit the wheel motions relative to the vehicle to the shock absorber by a lever, a point of which moves on a substantially straight line, and whose other point moves on a circle relative to the shock absorber.

ROBERT SUCZEK.